(12) United States Patent
Rajkumar Kannan et al.

(10) Patent No.: US 12,524,233 B2
(45) Date of Patent: Jan. 13, 2026

(54) SOURCE CODE DIFFERENTIAL PRUNING-BASED DATASET CREATION

(71) Applicant: Accenture Global Solutions Limited, Dublin (IE)

(72) Inventors: Karthik Rajkumar Kannan, Chennai (IN); Malek Ben Salem, Falls Church, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 237 days.

(21) Appl. No.: 18/311,018

(22) Filed: May 2, 2023

(65) Prior Publication Data

US 2024/0370255 A1 Nov. 7, 2024

(51) Int. Cl.
*G06F 8/77* (2018.01)
*G06F 8/72* (2018.01)
*G06F 11/3698* (2025.01)
*G06F 21/57* (2013.01)

(52) U.S. Cl.
CPC .......... *G06F 8/72* (2013.01); *G06F 8/77* (2013.01); *G06F 11/3698* (2025.01); *G06F 21/577* (2013.01)

(58) Field of Classification Search
USPC ......................................................... 717/120
See application file for complete search history.

(56) References Cited

U.S. PATENT DOCUMENTS

2007/0282951 A1* 12/2007 Selimis .................. H04L 67/75
709/205
2018/0052998 A1* 2/2018 Rhee .................. G06F 21/6218
2018/0157845 A1 6/2018 Mehta
2019/0228319 A1 7/2019 Gupta et al.
2019/0370473 A1 12/2019 Matrosov et al.
(Continued)

FOREIGN PATENT DOCUMENTS

CN      110245496 A      9/2019
EP       3441875 A1      2/2019
WO    2022096574 A1      5/2022

OTHER PUBLICATIONS

Non-Final Office Action for U.S. Appl. No. 18/034,844 dated Jan. 23, 2025, 20 Pages.

*Primary Examiner* — Jason D Mitchell
(74) *Attorney, Agent, or Firm* — Mannava & Kang, P.C.

(57) ABSTRACT

In some examples, source code differential pruning-based dataset creation may include receiving source code that includes at least one vulnerability and at least one remediation that remediates the at least one vulnerability, extracting at least one remediated section, and identifying each sentence of the remediated section. A plurality of clusters may be generated based on an analysis of each identified sentence of the remediated section to determine a score with respect to a specified cluster that includes the identified sentence. Further, a determination may be made as to whether the score is greater than a specified threshold. Each identified sentence for which the score is greater than the specified threshold may be designated as a relevant sentence. An auxiliary dataset may be generated based on a plurality of relevant sentences and include at least one relevant vulnerability and at least one relevant remediation that remediates the relevant vulnerability.

17 Claims, 9 Drawing Sheets

(56) References Cited

U.S. PATENT DOCUMENTS

| | | |
|---|---|---|
| 2019/0384910 A1* | 12/2019 | Orihara .................. G06F 21/56 |
| 2020/0145455 A1* | 5/2020 | Nandi .................. G06F 21/577 |
| 2020/0202007 A1 | 6/2020 | Nagaraja et al. |
| 2021/0124830 A1 | 4/2021 | Dinh et al. |
| 2022/0043638 A1* | 2/2022 | Krishnaswamy ......... G06F 8/38 |
| 2022/0188444 A1* | 6/2022 | Stoler .................... H04L 9/006 |
| 2023/0032208 A1* | 2/2023 | Kobren ................ G06F 18/214 |
| 2023/0120174 A1* | 4/2023 | Seck ................... H04W 12/122 |
| | | 726/25 |
| 2024/0028740 A1 | 1/2024 | Chan et al. |
| 2024/0119160 A1* | 4/2024 | Raj ........................... G06F 8/65 |
| 2024/0248995 A1* | 7/2024 | Gazit ....................... G06F 8/77 |
| 2024/0272971 A1* | 8/2024 | Xiao ....................... G06F 9/548 |
| 2024/0303075 A1* | 9/2024 | Chatterjee ................ G06F 8/77 |
| 2024/0403438 A1 | 12/2024 | Chan et al. |

\* cited by examiner

```
If (data != null)
{
    String names[] = data.split(".");
    int successCount = 0;
    Connection dbConnection = null;
    PreparedStatement sqlStatement = null;
    try
    {
        /* FIX: Use prepared statement and executeBatch (properly) */
        dbConnection = IO.getDBConnection();
        sqlStatement = dbConnection.prepareStatement("update users set hitcount=hitcount+1 where name=?");
        for (int i = 0; i < names.length; i++)
        {
            sqlStatement.setString(1, names[i]);
            sqlStatement.addBatch();
        }
        int resultsArray[] = sqlStatement.executeBatch();
        for (int I = 0; i < names.length; i++)
        {
            if (resultsArray[i] > 0)
            {
                successCount+= 2;
                If (successCpunt > 1) IO.logger.log(Level.DEBUG, "Adding the successCount");
            }
        }
        IO.writeLine("Succeeded in " + successCount + " out of " + names.length + " queries.");
    }
    catch (SQLException exceptSql)
    {
        IO.logger.log(Level.WARNING, "Error getting datatbase connection", exceptSql);
    }
}
```

RECEIVE SOURCE CODE THAT INCLUDES AT LEAST ONE VULNERABILITY AND AT LEAST ONE REMEDIATION THAT REMEDIATES THE AT LEAST ONE VULNERABILITY
702

GENERATING, BASED ON AN ANALYSIS OF EACH IDENTIFIED SENTENCE OF AT LEAST ONE REMEDIATED SECTION OF THE SOURCE CODE, A PLURALITY OF CLUSTERS
704

DETERMINING, FROM EACH IDENTIFIED SENTENCE OF A SPECIFIED CLUSTER OF THE PLURALITY OF CLUSTERS, AT LEAST ONE RELEVANT SENTENCE
706

GENERATING, BASED ON A PLURALITY OF RELEVANT SENTENCES, AN AUXILIARY DATASET THAT INCLUDES AT LEAST ONE RELEVANT VULNERABILITY AND AT LEAST ONE RELEVANT REMEDIATION THAT REMEDIATES THE AT LEAST ONE RELEVANT VULNERABILITY
708

FIG. 7

SOURCE CODE DIFFERENTIAL PRUNING-BASED DATASET CREATION

BACKGROUND

A software application may include source code that is used to perform specified functions associated with the application. The software application may be subject to attacks to alter an intended performance of the specified functions. Various techniques may be utilized to minimize vulnerability of the software application to such attacks.

BRIEF DESCRIPTION OF DRAWINGS

Features of the present disclosure are illustrated by way of example and not limited in the following figure(s), in which like numerals indicate like elements, in which:

FIG. 2 illustrates relevant versus irrelevant data to illustrate operation of the source code differential pruning-based dataset creation apparatus of FIG. 1, in accordance with an example of the present disclosure;

FIG. 7 illustrates a flowchart of an example method for source code differential pruning-based dataset creation, in accordance with an example of the present disclosure.

DETAILED DESCRIPTION

Figure 1:
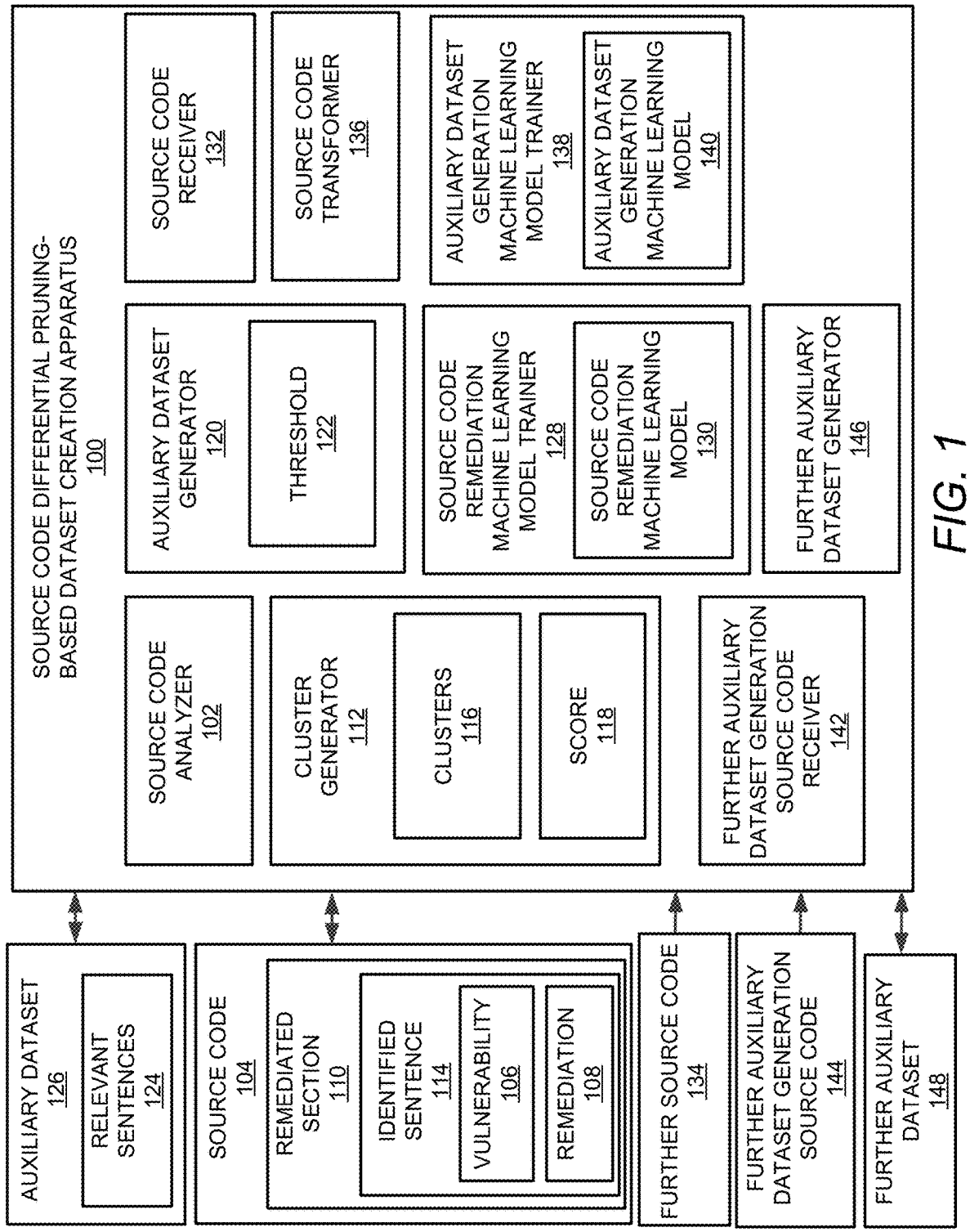
FIG. 1 illustrates a layout of a source code differential pruning-based dataset creation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Source code differential pruning-based dataset creation apparatuses, methods for source code differential pruning-based dataset creation, and non-transitory computer readable media having stored thereon machine readable instructions to provide source code differential pruning-based dataset creation are disclosed herein. The apparatuses, methods, and non-transitory computer readable media disclosed herein provide for implementation of differential pruning to segregate irrelevant data from the relevant data. In this regard, the differential pruning as disclosed herein may represent a machine learning model-based approach that utilizes unsupervised and supervised learning. For the apparatuses, methods, and non-transitory computer readable media disclosed herein, as a first step, a dataset may be utilized to generate a K-nearest neighbor search space, where the dataset is divided into sentences and clustered. As a next step, a score may be determined for each sentence based on a number of sentences available in an associated cluster. If the score is greater than a specified threshold, the sentence may be classified as relevant within the dataset, or otherwise, the sentence may be classified as not relevant. Based on this analysis, the data for a dataset may be classified as noise (e.g., irrelevant data) or relevant data.

With respect to the apparatuses, methods, and non-transitory computer readable media disclosed herein, in order for machine translation to translate vulnerable code to the remediated code, it is technically challenging to generate data that includes vulnerable code and remediated code. In this regard, source code may typically include a fix (e.g., remediation) for a vulnerability, with the source code being committed to a source code repository.

In some cases, a commit identification (ID) may be utilized to fix a vulnerability and to commit the source code, which leads to a possibility of extracting a vulnerability from the commits based on the commit ID and its description. However, there may be instances where the same commit ID is used for committing functional and other issues. These attributes of a commit ID may lead to noise in a dataset, with the noise representing irrelevant data that needs to be avoided. In some cases, more than 50% of the commit IDs may include noise.

In some cases, a supervised learning technique may utilize support from a subject matter expert (SME) in different languages to label data manually, and create a dataset that may be denoted a tagged dataset. However, with respect to supervised learning, it is technically challenging to scale this approach to a relatively large dataset due to the need for manual labelling of the dataset.

Compared to the aforementioned supervised learning technique, a modified technique may initially include labelling a dataset using supervised learning, and thereafter utilizing the labeled dataset as a model to label new data. However, with respect to this modified approach, a quality of the resulting labeling may depend on a size and/or accuracy of the initially labeled dataset that is used to generate the model. If the size and/or accuracy of the initially labeled dataset is inadequate, the resulting model may generate low quality results with respect to subsequent labelling of a dataset.

In order to address at least the aforementioned technical challenges related to generation of data that includes vulnerable code and remediated code, the apparatuses, methods, and non-transitory computer readable media disclosed herein may implement differential pruning to identify relevant source code that includes vulnerable code and remediated code, compared to irrelevant source code.

For the apparatuses, methods, and non-transitory computer readable media disclosed herein, with respect to the application of differential pruning, data that occurs repeatedly may be assumed to be relevant and related to a vulnerability and remediated fix. If a commit ID or commit description mentions a Common Vulnerabilities and Exposures (CVE) ID, or any vulnerability name or description such as Structured Query Language (SQL) Injection, the data may be considered to include SQL Injection related data. Further, the data may include some functional or other fixes. If SQL Injection related data is extracted from the source code, the data may include repeated pairs of SQL Injection related fixes.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example source code differential pruning-based dataset creation apparatus (hereinafter also referred to as "apparatus 100").

Referring to FIG. 1, the apparatus 100 may include a source code analyzer 102 that is executed by at least one hardware processor (e.g., the hardware processor 602 of FIG. 6, and/or the hardware processor 804 of FIG. 8) to receive source code 104 that includes at least one vulnerability 106 and at least one remediation 108 that remediates the at least one vulnerability 106. The source code analyzer 102 may extract, from the source code 104, at least one remediated section 110. The source code analyzer 102 may identify, from the extracted at least one remediated section 110, each sentence of the at least one remediated section 110.

A cluster generator 112 that is executed by at least one hardware processor (e.g., the hardware processor 602 of FIG. 6, and/or the hardware processor 804 of FIG. 8) may generate, based on an analysis of each identified sentence 114 of the at least one remediated section 110, a plurality of clusters 116. The cluster generator 112 may determine, for each identified sentence of a specified cluster of the plurality of clusters 116, a score 118 with respect to the specified cluster that includes the identified sentence.

An auxiliary dataset generator 120 that is executed by at least one hardware processor (e.g., the hardware processor 602 of FIG. 6, and/or the hardware processor 804 of FIG. 8) may determine, for each identified sentence of the specified cluster of the plurality of clusters 116, whether the score 118 is greater than a specified threshold 122. The auxiliary dataset generator 120 may designate each identified sentence of the specified cluster of the plurality of clusters 116 for which the score 118 is greater than the specified threshold 122 as a relevant sentence. The auxiliary dataset generator 120 may generate, based on a plurality of relevant sentences 124, an auxiliary dataset 126 that includes at least one relevant vulnerability and at least one relevant remediation that remediates the at least one relevant vulnerability.

According to examples disclosed herein, the cluster generator 112 may generate, based on the analysis of each identified sentence of the at least one remediated section 110, the plurality of clusters 116 by generating, based on the analysis of each identified sentence of the at least one remediated section 110, the plurality of clusters in a k-nearest neighbors (KNN) search space.

A source code remediation machine learning model trainer 128 that is executed by at least one hardware processor (e.g., the hardware processor 602 of FIG. 6, and/or the hardware processor 804 of FIG. 8) may train at least one source code remediation machine learning model 130 by analyzing, from the auxiliary dataset 126, the at least one relevant vulnerability associated with the source code 104. The source code remediation machine learning model trainer 128 may analyze, from the auxiliary dataset 126 and for the at least one relevant vulnerability associated with the source code, the at least one relevant remediation that remediates the at least one relevant vulnerability.

A source code receiver 132 that is executed by at least one hardware processor (e.g., the hardware processor 602 of FIG. 6, and/or the hardware processor 804 of FIG. 8) may receive further source code 134 that includes at least one further vulnerability.

A source code transformer 136 that is executed by at least one hardware processor (e.g., the hardware processor 602 of FIG. 6, and/or the hardware processor 804 of FIG. 8) may receive, from the at least one trained source code remediation machine learning model 130, a further remediated code to remediate the at least one further vulnerability associated with the further source code 134. The source code transformer 136 may transform, based on the further remediated code, the further source code 134 to remediate the at least one further vulnerability associated with the further source code 134. For example, remediating a vulnerable code line to a non-vulnerable code line may include transforming a sequence of tokens to another sequence of tokens. The transformation may be performed using a deep neural network model (e.g., the source code remediation machine learning model 130) that includes an encoder-decoder architecture with an attention mechanism. Given a sequence of tokens, the deep neural network model may predict the output sequence of tokens. Before the input sequence is entered to the deep neural network model, the sequence may be abstracted. All user-defined variables and literals may be replaced with generic names such as ID1, STR1, NUM1, etc. The deep neural network model may predict the output sequence with those generic names. The generic names in the output sequence may be replaced with the original names after the prediction.

An auxiliary dataset generation machine learning model trainer 138 that is executed by at least one hardware processor (e.g., the hardware processor 602 of FIG. 6, and/or the hardware processor 804 of FIG. 8) may train at least one auxiliary dataset generation machine learning model 140 by analyzing, from the auxiliary dataset 126, the at least one relevant vulnerability associated with the source code 104. The auxiliary dataset generation machine learning model trainer 138 may analyze, from the auxiliary dataset 126 and for the at least one relevant vulnerability associated with the source code 104, the at least one relevant remediation that remediates the at least one relevant vulnerability.

A further auxiliary dataset generation source code receiver 142 that is executed by at least one hardware processor (e.g., the hardware processor 602 of FIG. 6, and/or the hardware processor 804 of FIG. 8) may receive further auxiliary dataset generation source code 144 that includes at least one further vulnerability.

A further auxiliary dataset generator 146 that is executed by at least one hardware processor (e.g., the hardware processor 602 of FIG. 6, and/or the hardware processor 804 of FIG. 8) may receive, from the at least one trained auxiliary dataset generation machine learning model 140, at least one further remediation to remediate the at least one further vulnerability associated with the further auxiliary dataset generation source code 144. The further auxiliary dataset generator 146 may generate, based on the at least one further remediation, a further auxiliary dataset 148 that includes the at least one further remediation associated with the at least one further vulnerability associated with the further auxiliary dataset generation source code 144.

Operation of the apparatus 100 is described in further detail with reference to FIGS. 1-5.

FIG. 2 illustrates relevant versus irrelevant data to illustrate operation of the apparatus 100, in accordance with an example of the present disclosure.

Referring to FIGS. 1 and 2, the source code analyzer 102 may receive source code 104 that includes at least one vulnerability 106 and at least one remediation 108 that remediates the at least one vulnerability 106. The source code analyzer 102 may extract, from the source code 104, at least one remediated section 110. The source code analyzer 102 may identify, from the extracted at least one remediated section 110, each sentence of the at least one remediated section 110. For example, as shown in FIG. 2, the source code analyzer 102 may identify relevant data such as the data 200 for machine learning. For example, the data 200 may include a fix such as "Use prepared statement and executeBatch (properly)". Similarly, the source code analyzer 102 may identify irrelevant data such as the data 202.

Figure 3:
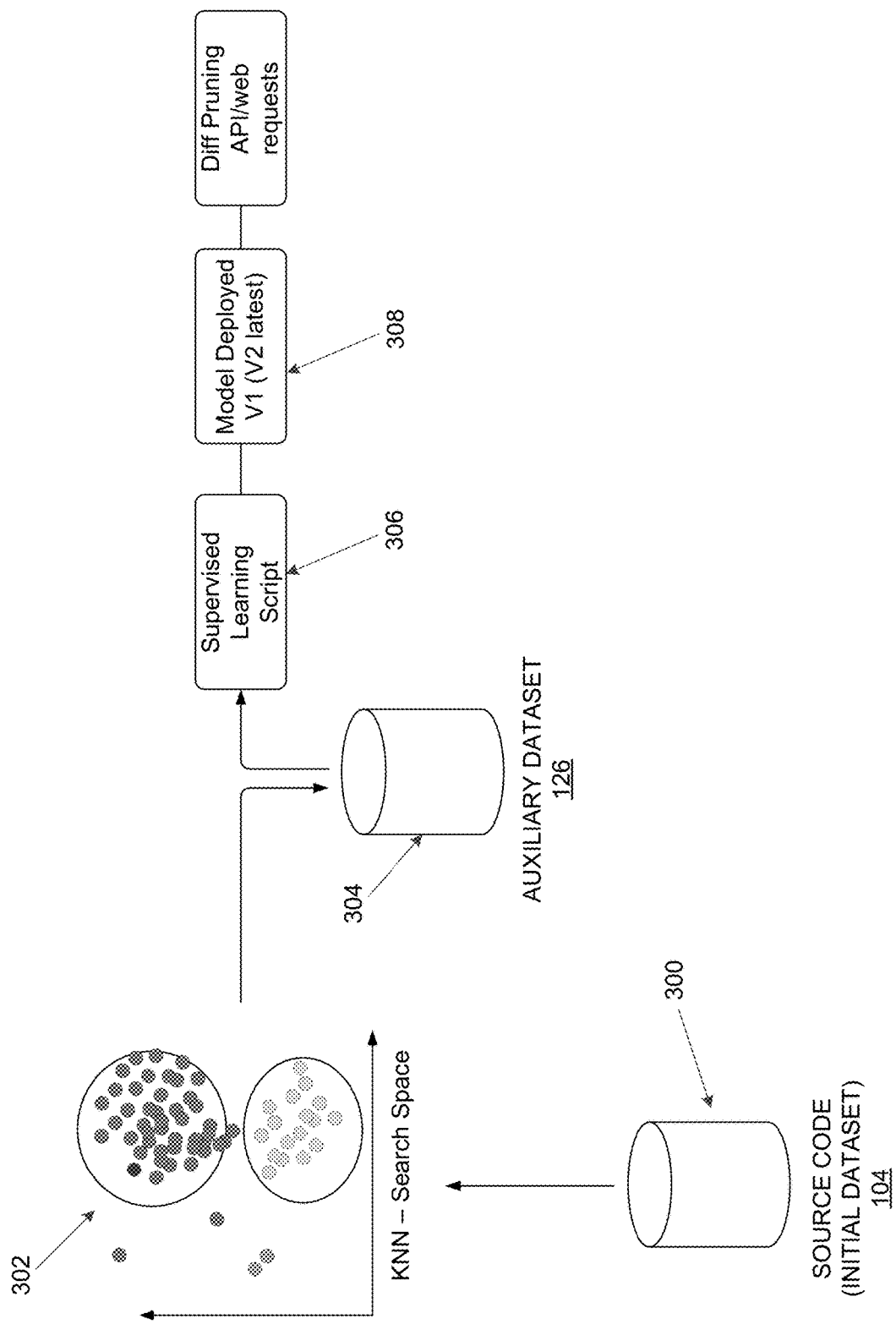
FIG. 3 illustrates further details of an architecture of the source code differential pruning-based dataset creation apparatus of FIG. 1, in accordance with an example of the present disclosure.

FIG. 3 illustrates further details of an architecture of the apparatus 100, in accordance with an example of the present disclosure.

Referring to FIGS. 1 and 3, at 300, the source code 104 (e.g., initial dataset) may include mixed data including relevant and irrelevant information. The source code analyzer 102 may extract, from the source code 104, at least one remediated section 110. The source code analyzer 102 may identify, from the extracted at least one remediated section 110, each sentence of the at least one remediated section 110. Thus, the source code analyzer 102 may extract a remediated section of the initial dataset and divide the data of the initial dataset sentence by sentence.

At 302, the cluster generator 112 may generate, based on an analysis of each identified sentence 114 of the at least one remediated section 110, a plurality of clusters 116. The cluster generator 112 may determine, for each identified sentence of a specified cluster of the plurality of clusters 116, a score 118 with respect to the specified cluster that includes the identified sentence. Thus, the cluster generator 112 may generate clusters 116 to create a cluster space. In this regard, the cluster generator 112 may implement a sentence transformer to add sentence by sentence in an encoder. With respect to the generated clusters 116, once all of the data has been allocated and added into the search space, a semantic search may be performed on the clusters to provide a score as follows:

{'corpus_id': 10, 'score': 1.0000004768371582}

For each specific sentence, a corpus identification (ID) and score may be provided.

At 304, the auxiliary dataset generator 120 may determine, for each identified sentence of the specified cluster of the plurality of clusters 116, whether the score 118 is greater than a specified threshold 122. The auxiliary dataset generator 120 may designate each identified sentence of the specified cluster of the plurality of clusters 116 for which the score 118 is greater than the specified threshold 122 as a relevant sentence. The auxiliary dataset generator 120 may generate, based on a plurality of relevant sentences 124, an auxiliary dataset 126 that includes at least one relevant vulnerability and at least one relevant remediation that remediates the at least one relevant vulnerability.

At 306, the source code remediation machine learning model trainer 128 may train at least one source code remediation machine learning model 130 by analyzing, from the auxiliary dataset 126, the at least one relevant vulnerability associated with the source code 104. The source code remediation machine learning model trainer 128 may analyze, from the auxiliary dataset 126 and for the at least one relevant vulnerability associated with the source code, the at least one relevant remediation that remediates the at least one relevant vulnerability.

At 308, the source code remediation machine learning model 130 may be deployed with respect to differential pruning of further source code.

Figure 4:
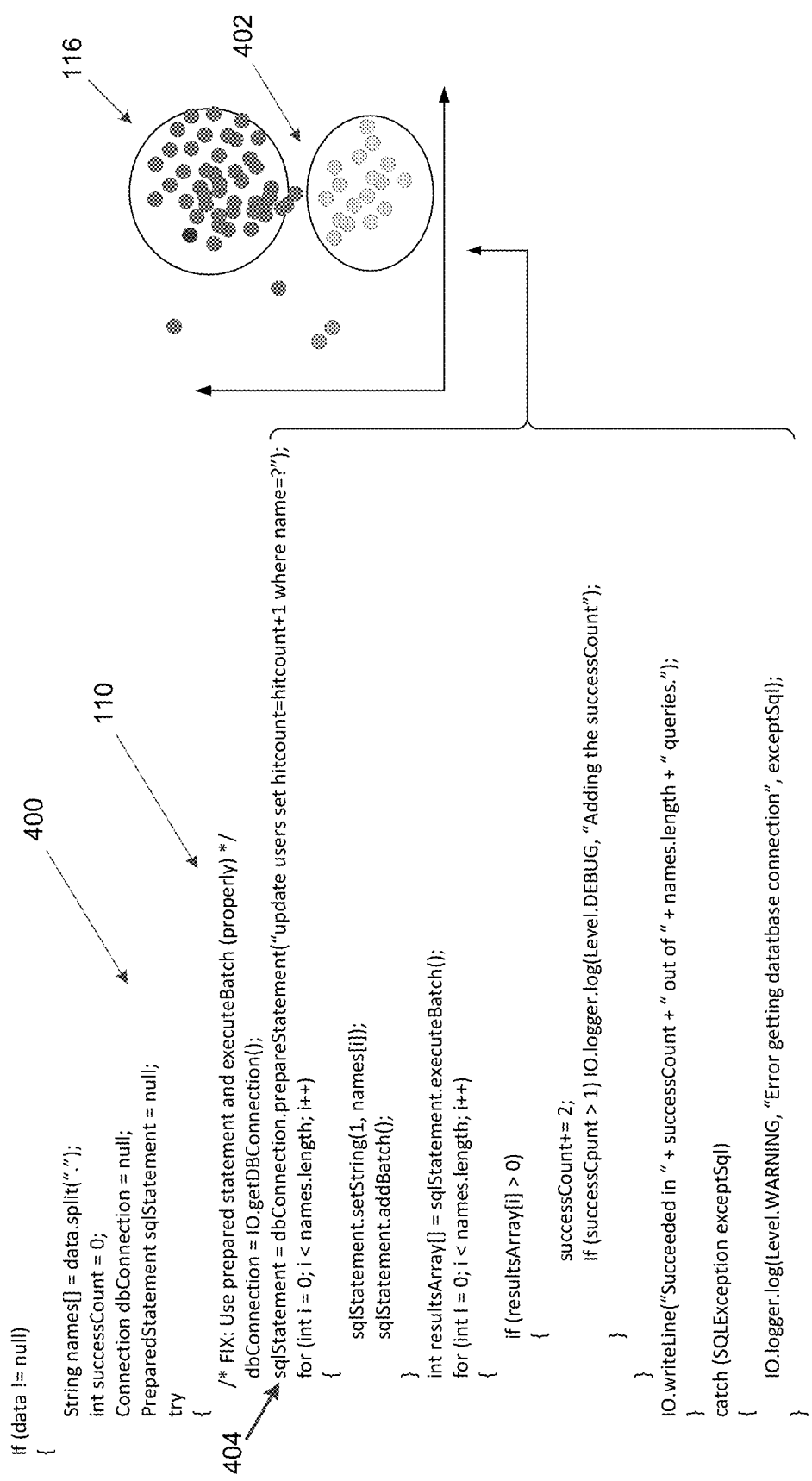
FIG. 4 illustrates operation of a sentence transformer encoder of the source code differential pruning-based dataset creation apparatus of FIG. 1, in accordance with an example of the present disclosure.

FIG. 4 illustrates operation of a sentence transformer encoder of apparatus 100, in accordance with an example of the present disclosure.

Referring to FIGS. 1 and 4, remediated code from the source code 104 (e.g., initial dataset) is shown at 400. In this regard, the source code 104 may be divided into a sentence transformer encoder. For example, the source code analyzer 102 may extract, from the source code 104, at least one remediated section 110. For FIG. 4, as shown at 404, the remediated section is dbConnection.preparedStatement (previously it was dbConnection.statement). The source code analyzer 102 may identify, from the extracted at least one remediated section 110, each sentence of the at least one remediated section 110. As shown at 402, the source code 104 may be divided line-by-line and placed into a KNN space. For example, the cluster generator 112 may generate, based on an analysis of each identified sentence 114 of the at least one remediated section 110, the plurality of clusters 116.

With respect to operation of the auxiliary dataset generator 120, the threshold 122 may be defined to segregate the score. The threshold 122 may be specified as a constant, and may be adjusted as needed based on the need of the dataset.

Once the threshold 122 is specified, the auxiliary dataset generator 120 may determine, for each identified sentence of the specified cluster of the plurality of clusters 116, whether the score 118 is greater than a specified threshold 122. The auxiliary dataset generator 120 may designate each identified sentence of the specified cluster of the plurality of clusters 116 for which the score 118 is greater than the specified threshold 122 as a relevant sentence. The auxiliary dataset generator 120 may generate, based on a plurality of relevant sentences 124, the auxiliary dataset 126 that includes at least one relevant vulnerability and at least one relevant remediation that remediates the at least one relevant vulnerability. In this regard, with respect to the auxiliary dataset 126, for a sentence that has a score greater than the threshold 122, the sentence may be identified as "action" and marked as "DO_NOTHING". The "DO_NOTHING" action may mean frequent data, and based on the aforementioned assumptions, frequent data may represent relevant data (e.g., vulnerable and remediated data).

For a sentence that has a score that is less than or equal to the threshold 122, the sentence may marked as "DELETE".

Figure 5:
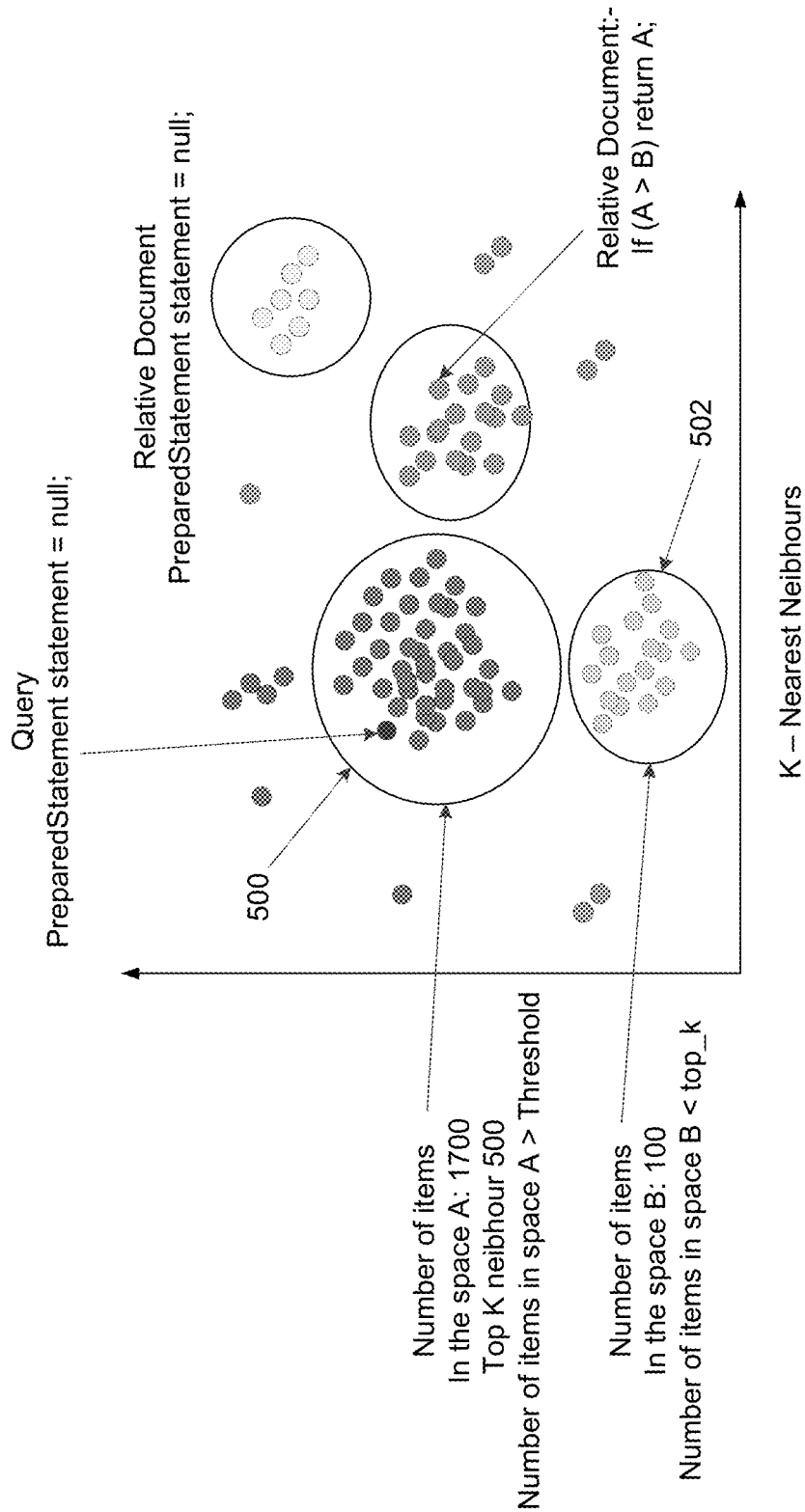
FIG. 5 illustrates auxiliary dataset creation to illustrate operation of the source code differential pruning-based dataset creation apparatus of FIG. 1, in accordance with an example of the present disclosure.

FIG. 5 illustrates auxiliary dataset creation to illustrate operation of apparatus 100, in accordance with an example of the present disclosure.

Referring to FIGS. 1 and 5, assuming that the threshold is 1000, cluster 500 may represent Space A that includes 1700 sentences, with top K neighbors including 500 sentences that include a score greater than the threshold. Cluster 502 may represent Space B that includes 100 sentences, where a number of items in space B is less than the top K. In order to generate the auxiliary dataset 126, an analysis of all of the sentences may be performed as follows: if result_score>threshold: return 1 or return 0.

Once the auxiliary dataset 126 is generated, the further auxiliary dataset generator 146 may utilize a Convolutional Neural Network (CNN) model (e.g., the auxiliary dataset generation machine learning model 140) for classification from the auxiliary dataset 126.

Hyper parameters for the CNN model (e.g., the auxiliary dataset generation machine learning model 140) may be specified as follows.

Hyper parameter embedding_dim for the auxiliary dataset generation machine learning model 140 (as well as the source code remediation machine learning model 130) may be specified as 64. In this regard, an embedding is a relatively low-dimensional space into which high-dimensional vectors may be translated. Embeddings may make it easier to perform machine learning on large inputs such as sparse vectors representing words.

Hyper parameter seq_length for the auxiliary dataset generation machine learning model 140 (as well as the source code remediation machine learning model 130) may be specified as 600. In this regard, a sequence length may represent the length of the sequence of input data.

Hyper parameter num_classes for the auxiliary dataset generation machine learning model 140 (as well as the source code remediation machine learning model 130) may be specified as 2. In this regard, a number of possible outputs may be either 0 or 1.

Hyper parameter kernel_size for the auxiliary dataset generation machine learning model 140 (as well as the source code remediation machine learning model 130) may be specified as 5. In this regard, kernel_size may represent the size of the convolutional filter.

Hyper parameter vocab_size for the auxiliary dataset generation machine learning model 140 (as well as the source code remediation machine learning model 130) may be specified as 5000. In this regard, vocab_size may represent the size of the vocabulary.

Hyper parameter hidden_dim for the auxiliary dataset generation machine learning model 140 (as well as the source code remediation machine learning model 130) may be specified as 128. In this regard, a hidden dimension may refer to the hidden network between the input and the output layers.

Hyper parameter dropout_keep_prob for the auxiliary dataset generation machine learning model 140 (as well as the source code remediation machine learning model 130) may be specified as 0.5. In this regard, a term "dropout" may refer to dropping out of the nodes (e.g., input and hidden layer) in a neural network. All of the forward and backwards connections with a dropped node may be temporarily removed, thus creating a new network architecture out of the parent network. The nodes may be dropped by a dropout probability of p, where the probability during the training of the model may be specified as 0.5.

Hyper parameter learning_rate for the auxiliary dataset generation machine learning model 140 (as well as the source code remediation machine learning model 130) may be specified as 1e−3. In this regard, a learning rate may represent the hyperparameter in optimization algorithms that controls how much the model needs to change in response to the estimated error for each time when the model's weights are updated. The learning rate may determine the frequency of cross-checking with model parameters. With respect to selection of the optimized learning rate, if the learning rate is relatively less, such a rate may slow down the training process. Alternatively, if the learning rate is relatively large, such a rate may not optimize the model properly.

Hyper parameter batch_size for the auxiliary dataset generation machine learning model 140 (as well as the source code remediation machine learning model 130) may be specified as 64. In this regard, with respect to batch size, in order to enhance the speed of the learning process, the training set may be divided into different subsets denoted as a batch.

Hyper parameter num_epochs for the auxiliary dataset generation machine learning model 140 (as well as the source code remediation machine learning model 130) may be specified as 50. In this regard, with respect to a number of epochs, an epoch may be defined as the complete cycle for training a machine learning model. An epoch may represent an iterative learning process. The number of epochs may vary from model to model, and various models may be created with more than one epoch. In order to determine the correct number of epochs, a validation error may be taken into account. The number of epochs may be increased until there is a reduction in a validation error. If there is no improvement in reduction error for the consecutive epochs, this may be used as an indication to stop increasing the number of epochs.

Hyper parameter print_per_batch for the auxiliary dataset generation machine learning model 140 (as well as the source code remediation machine learning model 130) may be specified as 100. In this regard, print_per_batch may print logs every 100 iteration, for example, by printing the loss and the accuracy details.

Hyper parameter save_per_batch for the auxiliary dataset generation machine learning model 140 (as well as the source code remediation machine learning model 130) may be specified as 10. In this regard, save_per_batch may save the checkpoint of the model every 10 iteration.

Figure 6:
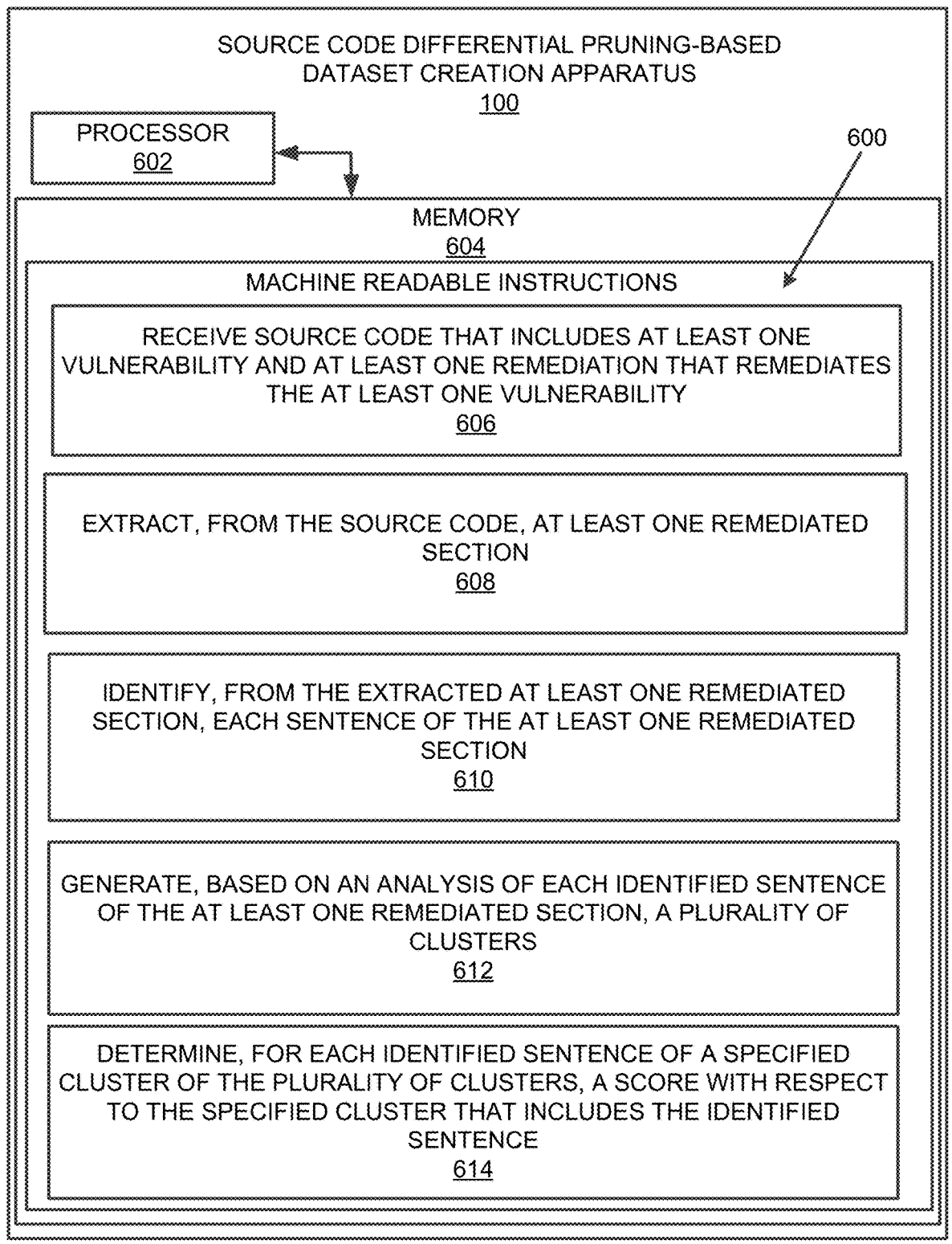
FIG. 6 illustrates an example block diagram for source code differential pruning-based dataset creation, in accordance with an example of the present disclosure.
Figure 6:
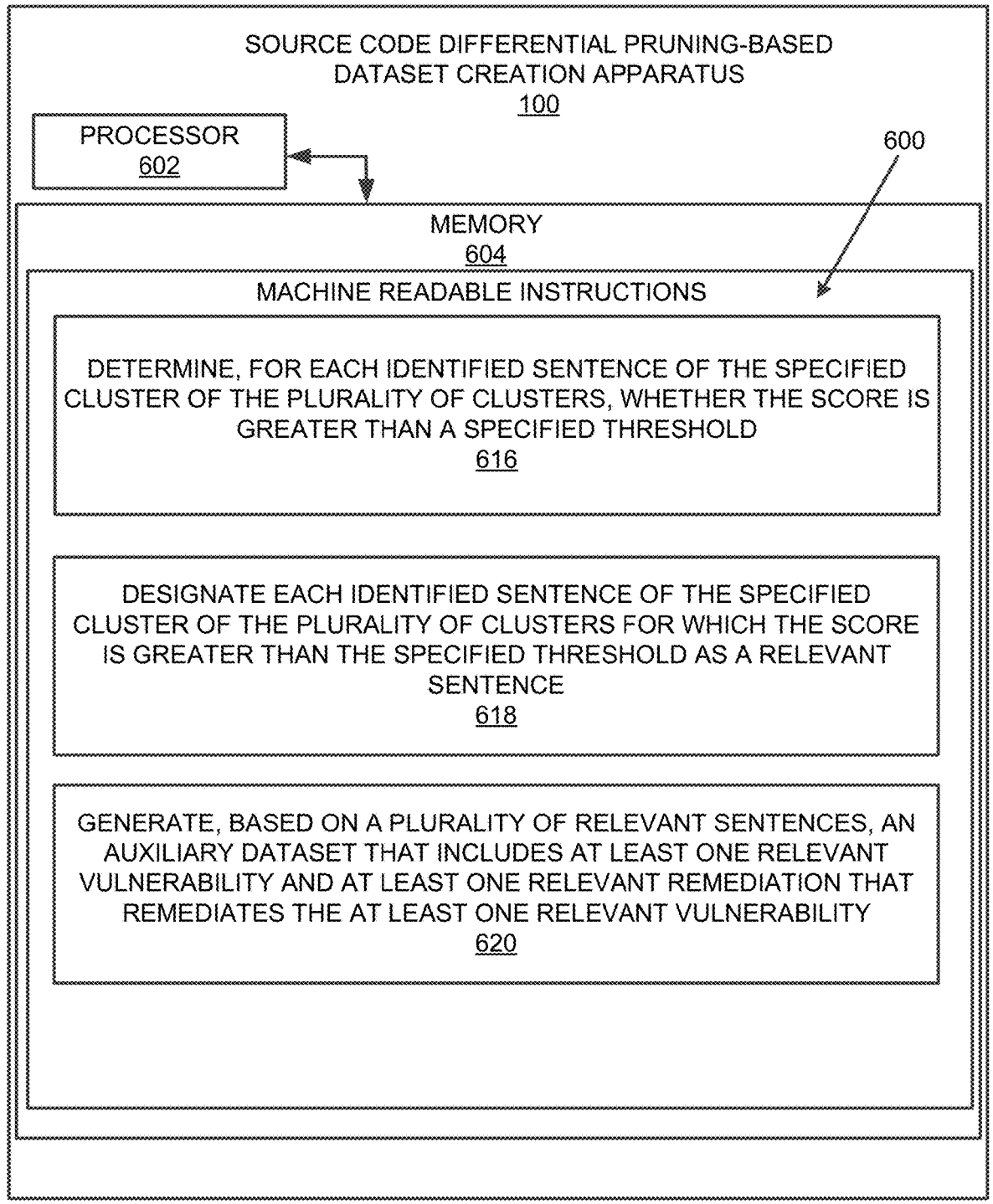
Figure 8:
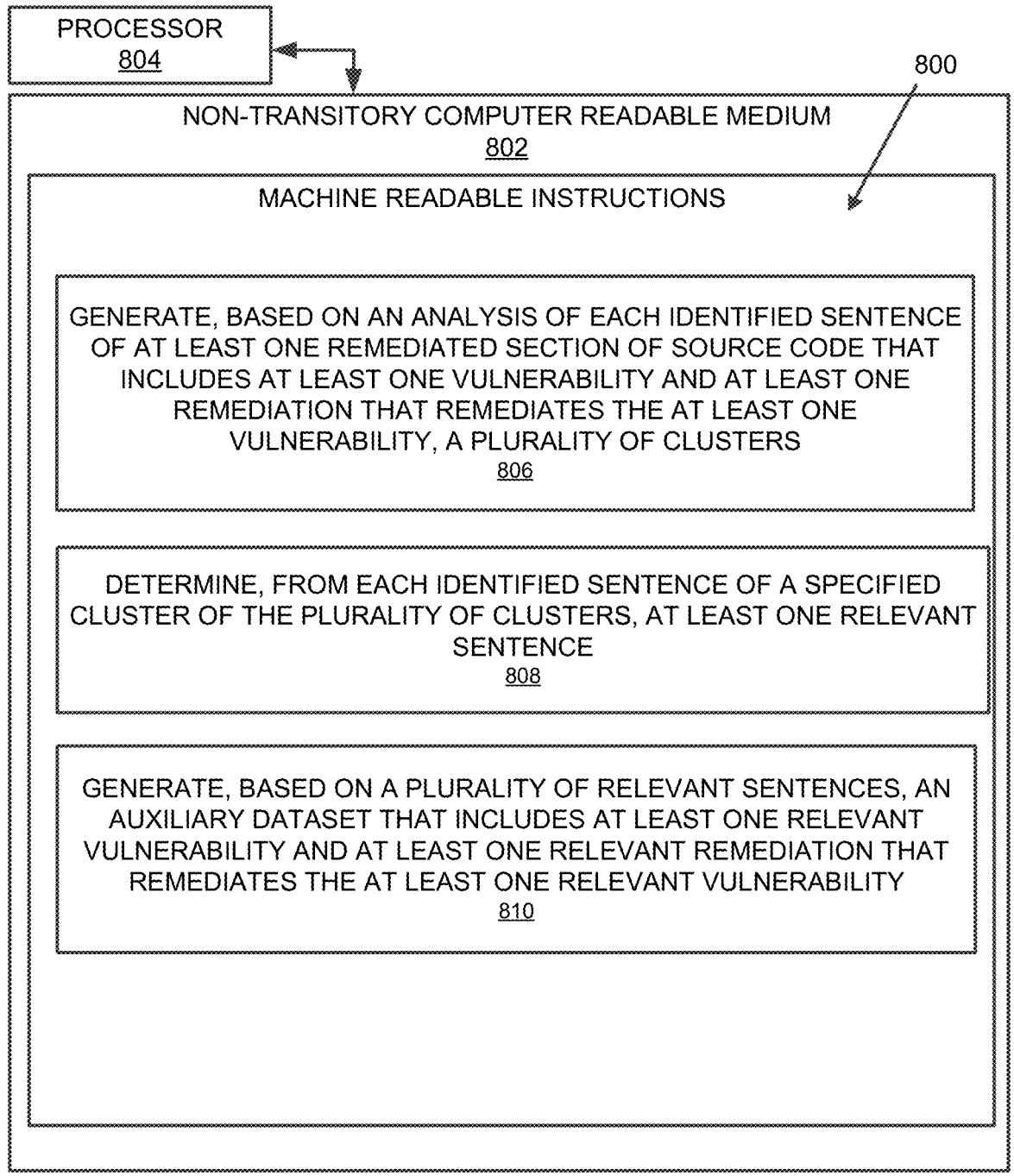
FIG. 8 illustrates a further example block diagram for source code differential pruning-based dataset creation, in accordance with another example of the present disclosure.

FIGS. 6-8 respectively illustrate an example block diagram 600, a flowchart of an example method 700, and a further example block diagram 800 for source code differential pruning-based dataset creation, according to examples. The block diagram 600, the method 700, and the block diagram 800 may be implemented on the apparatus 100 described above with reference to FIG. 1 by way of example and not of limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 storing machine readable instructions that when executed by the processor cause the processor to perform the instructions of the block diagram 600. The memory 604 may represent a non-transitory computer readable medium. FIG. 7 may represent an example method for source code differential pruning-based dataset creation, and the steps of the method. FIG. 8 may represent a non-transitory computer readable medium 802 having stored thereon machine readable instructions to provide source code differential pruning-based dataset creation according to an example. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to receive source code 104 that includes at least one vulnerability 106 and at least one remediation 108 that remediates the at least one vulnerability 106.

The processor 602 may fetch, decode, and execute the instructions 608 to extract, from the source code 104, at least one remediated section 110.

The processor 602 may fetch, decode, and execute the instructions 610 to identify, from the extracted at least one remediated section 110, each sentence of the at least one remediated section 110.

The processor 602 may fetch, decode, and execute the instructions 612 to generate, based on an analysis of each identified sentence 114 of the at least one remediated section 110, a plurality of clusters 116.

The processor 602 may fetch, decode, and execute the instructions 614 to determine, for each identified sentence of a specified cluster of the plurality of clusters 116, a score 118 with respect to the specified cluster that includes the identified sentence.

The processor 602 may fetch, decode, and execute the instructions 616 to determine, for each identified sentence of the specified cluster of the plurality of clusters 116, whether the score 118 is greater than a specified threshold 122.

The processor 602 may fetch, decode, and execute the instructions 618 to designate each identified sentence of the specified cluster of the plurality of clusters 116 for which the score 118 is greater than the specified threshold 122 as a relevant sentence.

The processor 602 may fetch, decode, and execute the instructions 620 to generate, based on a plurality of relevant sentences 124, an auxiliary dataset 126 that includes at least one relevant vulnerability and at least one relevant remediation that remediates the at least one relevant vulnerability.

Referring to FIGS. 1-5 and 7, and particularly FIG. 7, for the method 700, at block 702, the method may include receiving source code 104 that includes at least one vulnerability 106 and at least one remediation 108 that remediates the at least one vulnerability 106.

At block 704, the method may include generating, based on an analysis of each identified sentence of at least one remediated section 110 of the source code 104, a plurality of clusters 116.

At block 706, the method may include determining, from each identified sentence of a specified cluster of the plurality of clusters 116, at least one relevant sentence.

At block 708, the method may include generating, based on a plurality of relevant sentences, an auxiliary dataset 126 that includes at least one relevant vulnerability and at least one relevant remediation that remediates the at least one relevant vulnerability.

Referring to FIGS. 1-5 and 8, and particularly FIG. 8, for the block diagram 800, the non-transitory computer readable medium 802 may include instructions 806 to generate, based on an analysis of each identified sentence of at least one remediated section of source code 104 that includes at least one vulnerability 106 and at least one remediation 108 that remediates the at least one vulnerability, a plurality of clusters 116.

The processor 804 may fetch, decode, and execute the instructions 808 to determine, from each identified sentence of a specified cluster of the plurality of clusters 116, at least one relevant sentence.

The processor 804 may fetch, decode, and execute the instructions 810 to generate, based on a plurality of relevant sentences, an auxiliary dataset 126 that includes at least one relevant vulnerability 106 and at least one relevant remediation 108 that remediates the at least one relevant vulnerability.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A source code differential pruning-based dataset creation apparatus comprising:
    a source code analyzer, executed by at least one hardware processor, to:
        receive source code that includes at least one vulnerability and at least one remediation that remediates the at least one vulnerability;
        extract, from a plurality of sections in the source code, at least one remediated of the plurality of sections; and
        segment, the extracted at least one remediated section into a plurality of sentences;
    a cluster generator, executed by the at least one hardware processor, to:
        generate a plurality of clusters comprises the plurality of sentences, wherein each cluster of the plurality of clusters comprises an available number of sentences, wherein the plurality of clusters are generated in a k-nearest neighbors (KNN) search space based on an analysis of each sentence of the at least one remediated section; and
        determine, for each cluster of the plurality of clusters, a score based on the available number of sentences in each specified cluster of the plurality of clusters; and
    an auxiliary dataset generator, executed by the at least one hardware processor, to:
        determine, for each sentence of the specified cluster of the plurality of clusters, whether the score is greater than a specified threshold;
        responsive to the determination that the score is greater than the specified threshold:
            designate each sentence of the specified cluster as a relevant sentence; and
            generate, based on a plurality of designated relevant sentences in the specified cluster of the plurality of clusters, an auxiliary dataset that includes at least one relevant vulnerability and at least one relevant remediation that remediates the at least one relevant vulnerability in the auxiliary dataset, wherein the auxiliary dataset provides relevant information based on the plurality of sentences in the source code.

2. The source code differential pruning-based dataset creation apparatus according to claim 1, further comprising a source code remediation machine learning model trainer, executed by the at least one hardware processor, to train at least one source code remediation machine learning model by:
   analyzing, from the auxiliary dataset, the at least one relevant vulnerability associated with the source code; and
   analyzing, from the auxiliary dataset and for the at least one relevant vulnerability associated with the source code, the at least one relevant remediation that remediates the at least one relevant vulnerability.

3. The source code differential pruning-based dataset creation apparatus according to claim 2, further comprising:
   a source code receiver, executed by the at least one hardware processor, to receive further source code that includes at least one further vulnerability; and
   a source code transformer, executed by the at least one hardware processor, to:
      receive, from the at least one trained source code remediation machine learning model, a further remediated code to remediate the at least one further vulnerability associated with the further source code; and
      transform, based on the further remediated code, the further source code to remediate the at least one further vulnerability associated with the further source code.

4. The source code differential pruning-based dataset creation apparatus according to claim 1, further comprising an auxiliary dataset generation machine learning model trainer, executed by the at least one hardware processor, to train at least one auxiliary dataset generation machine learning model by:
   analyzing, from the auxiliary dataset, the at least one relevant vulnerability associated with the source code; and
   analyzing, from the auxiliary dataset and for the at least one relevant vulnerability associated with the source code, the at least one relevant remediation that remediates the at least one relevant vulnerability.

5. The source code differential pruning-based dataset creation apparatus according to claim 4, further comprising:
   a further auxiliary dataset generation source code receiver, executed by the at least one hardware processor, to receive further auxiliary dataset generation source code that includes at least one further vulnerability; and
   a further auxiliary dataset generator, executed by the at least one hardware processor, to:
      receive, from the at least one trained auxiliary dataset generation machine learning model, at least one further remediation to remediate the at least one further vulnerability associated with the further auxiliary dataset generation source code; and
      generate, based on the at least one further remediation, a further auxiliary dataset that includes the at least one further remediation associated with the at least one further vulnerability associated with the further auxiliary dataset generation source code.

6. A method for source code differential pruning-based dataset creation, the method comprising:
   receiving, by at least one hardware processor, source code that includes at least one vulnerability and at least one remediation that remediates the at least one vulnerability;
   extracting, by the at least one hardware processor, from a plurality of sections in the source code, at least one remediated section of the plurality of sections;
   segmenting, by the at least one hardware processor, the extracted at least one remediated section into a plurality of sentences;
   generating, by the at least one hardware processor, a plurality of clusters comprising the plurality of sentences, wherein each cluster of the plurality of clusters comprises an available number of sentences,
      wherein the plurality of clusters are generated in a k-nearest neighbors (KNN) search space based on an analysis of each sentence of the at least one remediated section;
   determining, by the at least one hardware processor, for each cluster of the plurality of clusters, a score based on an available number of sentences in each specified cluster of the plurality of clusters;
   determining, by the at least one hardware processor, for each sentence of the specified cluster of the plurality of clusters, whether the score is greater than a specified threshold;
   responsive to determining that the score is greater than the specified threshold:
      designating each sentence of the specified cluster as a relevant sentence; and
      generating, by the at one least hardware processor, based on a plurality of designated relevant sentences in the specified cluster of the plurality of clusters, an auxiliary dataset that includes at least one relevant vulnerability and at least one relevant remediation that remediates the at least one relevant vulnerability in the auxiliary dataset, wherein the auxiliary dataset provides relevant information based on the plurality of sentences in the source code.

7. The method for source code differential pruning-based dataset creation according to claim 6, further comprising:
   extracting the at least one remediated section from a plurality of remediated sections in the source code.

8. The method for source code differential pruning-based dataset creation according to claim 7, further comprising:
   identifying, by the at least hardware processor, from the extracted at least one remediated section, each sentence of the at least one remediated section.

9. The method for source code differential pruning-based dataset creation according to claim 6, further comprising training at least one source code remediation machine learning model by:
   analyzing, by the at least hardware processor, from the auxiliary dataset, the at least one relevant vulnerability associated with the source code; and
   analyzing, by the at least hardware processor, from the auxiliary dataset and for the at least one relevant vulnerability associated with the source code, the at least one relevant remediation that remediates the at least one relevant vulnerability.

10. The method for source code differential pruning-based dataset creation according to claim 9, further comprising:
   receiving, by the at least hardware processor, further source code that includes at least one further vulnerability;

receiving, by the at least hardware processor, from the at least one trained source code remediation machine learning model, a further remediated code to remediate the at least one further vulnerability associated with the further source code; and transforming, by the at least hardware processor, based on the further remediated code, the further source code to remediate the at least one further vulnerability associated with the further source code.

11. The method for source code differential pruning-based dataset creation according to claim 6, further comprising:
training, by the at least hardware processor, at least one auxiliary dataset generation machine learning model by:
analyzing, by the at least hardware processor, from the auxiliary dataset, the at least one relevant vulnerability associated with the source code; and
analyzing, by the at least hardware processor, from the auxiliary dataset and for the at least one relevant vulnerability associated with the source code, the at least one relevant remediation that remediates the at least one relevant vulnerability.

12. The method for source code differential pruning-based dataset creation according to claim 11, further comprising:
receiving, by the at least hardware processor, further auxiliary dataset generation source code that includes at least one further vulnerability;
receiving, by the at least hardware processor, from the at least one trained auxiliary dataset generation machine learning model, at least one further remediation to remediate the at least one further vulnerability associated with the further auxiliary dataset generation source code; and
generating, by the at least hardware processor, based on the at least one further remediation, a further auxiliary dataset that includes the at least one further remediation associated with the at least one further vulnerability associated with the further auxiliary dataset generation source code.

13. A non-transitory computer readable medium having stored thereon machine readable instructions, the machine readable instructions, when executed by at least one hardware processor, cause the at least one hardware processor to:
receive source code that includes at least one vulnerability and at least one remediation that remediates the at least one vulnerability;
extract, from a plurality of sections in the source code, at least one remediated section of the plurality of sections;
segment the extracted at least one remediated section into a plurality sentences;
generate a plurality of clusters comprising the plurality of sentences, wherein each cluster of the plurality of clusters comprises an available number of sentences, wherein the plurality of clusters are generated in a k-nearest neighbors (KNN) search space based on an analysis of each sentence of the at least one remediated section;
determine, for each cluster of the plurality of clusters, a score based on the available number of sentences in each specified cluster of the plurality of clusters;
determine, for each sentence of the specified cluster of the plurality of clusters, whether the score is great than a specified threshold;
responsive to a determination that the score is greater than the specified threshold:
designate each sentence of the specified cluster as a relevant sentence; and
generate, based on a plurality of designated relevant sentences in the specified cluster of the plurality of clusters, an auxiliary dataset that includes at least one relevant vulnerability and at least one relevant remediation that remediates the at least one relevant vulnerability in the auxiliary dataset, wherein the auxiliary dataset provides relevant information based on the plurality of sentences in the source code.

14. The non-transitory computer readable medium according to claim 13, wherein the machine readable instructions, when executed by the at least one hardware processor, further cause the at least one hardware processor to train at least one source code remediation machine learning model by:
analyzing, from the auxiliary dataset, the at least one relevant vulnerability associated with the source code; and
analyzing, from the auxiliary dataset and for the at least one relevant vulnerability associated with the source code, the at least one relevant remediation that remediates the at least one relevant vulnerability.

15. The non-transitory computer readable medium according to claim 14, wherein the machine readable instructions, when executed by the at least one hardware processor, further cause the at least one hardware processor to:
receive further source code that includes at least one further vulnerability;
receive, from the at least one trained source code remediation machine learning model, a further remediated code to remediate the at least one further vulnerability associated with the further source code; and
transform, based on the further remediated code, the further source code to remediate the at least one further vulnerability associated with the further source code.

16. The non-transitory computer readable medium according to claim 13, wherein the machine readable instructions, when executed by the at least one hardware processor, further cause the at least one hardware processor to train at least one auxiliary dataset generation machine learning model by:
analyzing, from the auxiliary dataset, the at least one relevant vulnerability associated with the source code; and
analyzing, from the auxiliary dataset and for the at least one relevant vulnerability associated with the source code, the at least one relevant remediation that remediates the at least one relevant vulnerability.

17. The non-transitory computer readable medium according to claim 16, wherein the machine readable instructions, when executed by the at least one hardware processor, further cause the at least one hardware processor to:
receive, using a further auxiliary dataset generation source code receiver, further auxiliary dataset generation source code that includes at least one further vulnerability;
receive, from the at least one trained auxiliary dataset generation machine learning model, at least one further remediation to remediate the at least one further vulnerability associated with the further auxiliary dataset generation source code; and
generate, based on the at least one further remediation, a further auxiliary dataset that includes the at least one further remediation associated with the at least one further vulnerability associated with the further auxiliary dataset generation source code.

* * * * *